Sept. 14, 1943.  W. L. CARLSON  2,329,249
MOTORCYCLE SPEEDOMETER DRIVE
Filed Feb. 21, 1942  2 Sheets-Sheet 1

Inventor
Wilbur L. Carlson
By Blackmore, Spencer & Flint
Attorneys

Sept. 14, 1943.  W. L. CARLSON  2,329,249
MOTORCYCLE SPEEDOMETER DRIVE
Filed Feb. 21, 1942  2 Sheets-Sheet 2
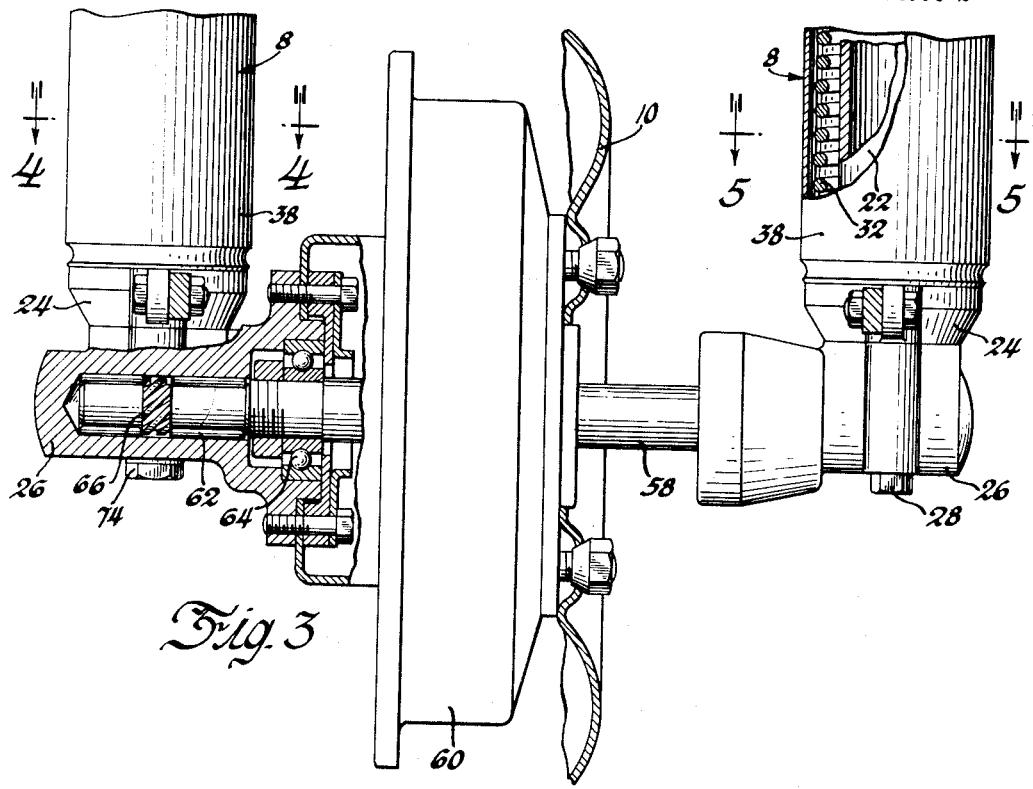
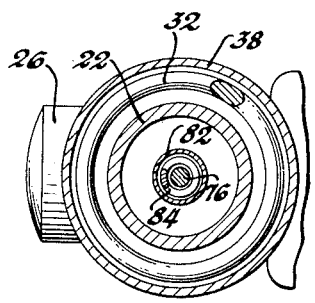
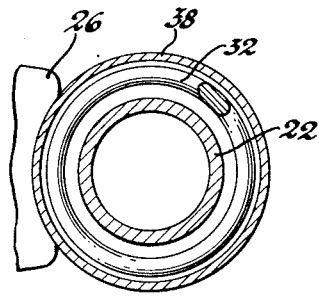
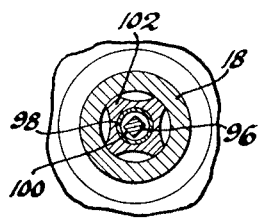
Inventor
Wilbur L. Carlson
By Blackmore, Spencer & Flint
Attorneys Patented Sept. 14, 1943

2,329,249

UNITED STATES PATENT OFFICE 2,329,249

MOTORCYCLE SPEEDOMETER DRIVE

Wilbur L. Carlson, Rochester, N. Y., assignor to General Motors Corporation, Detroit, Mich., a corporation of Delaware Application February 21, 1942, Serial No. 431,810

7 Claims. (Cl. 74—12)

The present invention relates generally to speedometer driving mechanism and more particularly to the location and construction thereof especially for use on motorcycles.

It is an object of the invention to provide a speedometer driving mechanism in which there is a direct drive to the speedometer from the front axle and thereby eliminate flexible shaft or angular connections which are used in present types of motorcycle speedometer drives.

A further object is the provision of a speedometer driving mechanism which is fully enclosed and protected within a portion of the resilient suspension for the front axle.

A still further object is to provide a speedometer driving mechanism wherein telescoping shaft sections are mounted within telescoping parts of a front axle suspension incorporating a hydraulic shock absorber.

Other objects and the advantages of the present invention will be apparent from the following description of the embodiment thereof which is illustrated in the accompany drawings in which:

Figure 3 is a fragmentary transverse view with parts in section taken substantially on line 3—3 of Figure 1.

Figures 1, 2:
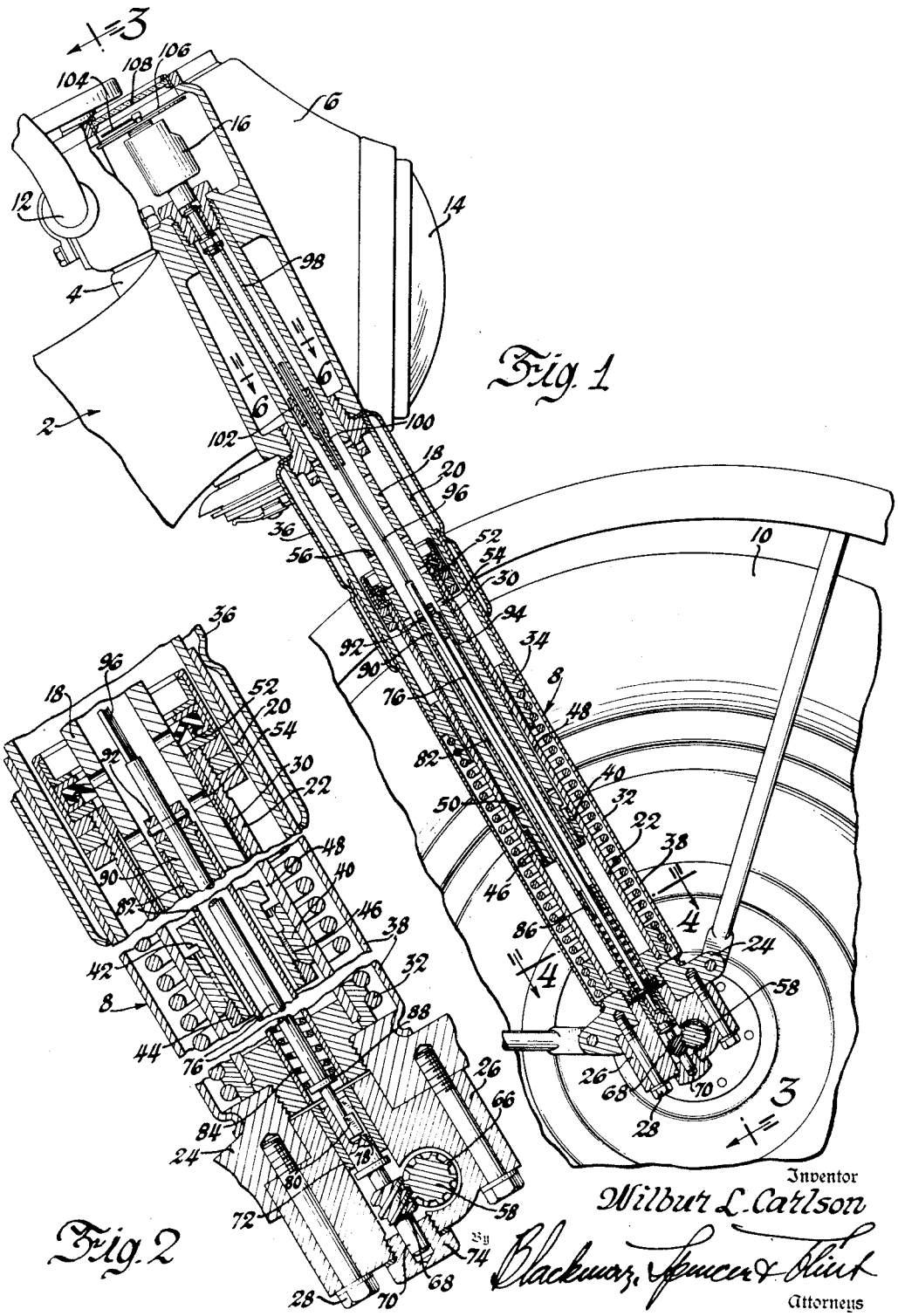
Figure 1 is a fragmentary side elevation of the front portion of a motorcycle with parts in vertical section to show the front axle suspension and speedometer driving mechanism.
Figure 2 is an enlarged, fragmentary vertical section of parts of the front axle suspension and speedometer driving mechanism shown in Figure 1.

Figures 4, 5 and 6 are sections taken respectively on lines 4—4 and 5—5 of Figure 3 and line 6—6 of Figure 1.

Referring first to Figure 1, the motorcycle frame which is indicated at 2 is provided with the head 4 adjacent its front end for the usual swivel mounting of the steering fork which includes the steering head 6 and the spaced depending fork arms indicated generally at 8 between which is journaled the front wheel 10.

The steering head 6 is provided with the usual handle bars such as shown in part at 12, and is adapted to mount the usual controls and instruments of which only the headlight 14 and speedometer 16 have been illustrated. As will be apparent from the showing in Figure 1, the speedometer 16 is located within the steering head with the axis of its drive shaft in substantial alinement with the longitudinal axis of one of the fork arms 8 to provide for a direct drive to the speedometer as will be fully described hereinafter.

The front axle is mounted for movement relative to the motorcycle frame by telescoping parts with a spring suspension and hydraulic shock absorber or damping means incorporated in the construction of the two fork arms 8 which are identical insofar as details of these features are concerned.

Each of the fork arms 8 includes inner and outer spaced concentric sleeves 18 and 20 which are secured at their upper ends to the head 6 and a sleeve 22 secured at its lower end to a bracket 24 to which the axle housing 26 is detachably secured as by bolts 28. The sleeve 22 extends upwardly between the sleeves 18 and 20 and is provided with a bearing member 30 adapted to engage and slide on the inner sleeve 18. The spring suspension for the front axle is provided by a coil spring 32 which is secured at its lower end to the bracket 24 and at its upper end to a bracket 34 on the lower end of the outer sleeve 20. The spring 32 and outer sleeve 20 are protected and enclosed by relatively thin metal telescoping sleeves 36 and 38 connected as shown to the head 6 and bracket 24, respectively.

Referring now to the hydraulic shock absorber or damping means, the lower end of the inner sleeve 18 carries a valve 40 which is interposed between this sleeve and sleeve 22 and is mounted for limited longitudinal movement on sleeve 18 between a shoulder 42 and a screw member 44. The valve 40 is formed at its lower end with a tapered valve seat adapted to engage a tapered seat on the screw member 44 when in its lowermost position and the inner surface of valve 40 is formed with longitudinal grooves or flutes 46 to provide passages through or past the valve when the valve seats are not in engagement. An annular chamber 48 is thereby provided between the sleeves 18 and 22 which extends from the bearing member 30 to the valve 40 and the sleeve 18 is provided with relatively restricted openings 50 into this chamber.

Any suitable fluid such as lubricating oil is placed within the lower portions of sleeves 18 and 22 and the construction described above functions as a damping means in the following manner. As the axle and sleeve 22 move upwardly the valve 40 will rise and as the chamber 48 expands in length by movement of bearing member 30 away from the valve 40, fluid will be drawn into the chamber 48 past the valve. The upward movement of the axle and sleeve 22 will be resisted by the compression of coil spring 32 and when the axle and sleeve 22 move downwardly, the valve 40 will seat on screw member 44 and the fluid which is then being compressed between bearing member 30 and valve 40 can escape only slowly through the relatively restricted openings 50 in sleeve 18. Thus it will be apparent that this arrangement provides a damping means or hydraulic shock absorber for the downward movement or rebound of the axle.

The upper end of sleeve 22 is provided with a suitable sealing means 52 which engages the sleeve 18 and openings 54 are provided in the sleeve 18 adjacent the sealing means to permit the return to within the sleeve 18 of any fluid which may escape from chamber 48 between the sleeve 18 and bearing member 30. Openings 56 may also be provided in sleeve 18 above the sealing means 52 to limit the amount of fluid that may be contained within sleeve 18 and provide a safety overflow for any excess fluid.

The front wheel 10 is secured as shown in Figure 3 to the axle 58 by means such as the brake drum 60 and the axle 58 is journaled in the spaced axle housings 26 by needle bearings 62 and ball bearings 64. As previously mentioned, the axle housings 26 are detachably secured as by bolts 28 to the brackets 24 at the lower ends of the fork arms 8 and it will therefore be apparent that the entire wheel and axle assembly may be readily removed and installed as a unit.

Proceeding now to the description of the speedometer driving mechanism which is adapted to be primarily associated with and contained within one of the fork arms 8, it will be seen that the axle 58 is formed adjacent one end with a suitable gear teeth 66 adapted to mesh with a worm gear 68 on shaft 70 mounted within one of the axle housings 26 by a bearing sleeve 72 and a removable end cap 74. The enlarged upper end of the gear shaft 70 is formed with a bore to receive the end of a drive shaft 76 and a slot 78 to receive a driving key 80 on the end of shaft 76 to thereby provide a disconnectible drive joint between the parts of the speedometer driving mechanism mounted within the fork 8 and head 6 and the parts mounted in the axle housing 26.

The lower portion of the drive shaft 76 extends through a tube 82 which is secured at its lower end to the bracket 24, and a spring 84 around the shaft 76 within the tube 82 is interposed between an abutment 86 fixed within the tube and a shoulder 88 on shaft 76 to force the shaft downwardly and hold the driving key 80 within the slot 78 of the gear shaft 70. The upper end of the tube 82 is provided with a bearing member 90 for the drive shaft 76 and downward movement of the shaft is limited by engagement of a stop 92 on the shaft with the bearing member 90. The tube 82 is provided with an opening 94 adjacent its upper end to admit the shock absorber fluid such as lubricating oil which may be contained within the sleeves 18 and 22 as heretofore described.

The upper end of the drive shaft 76 is squared as indicated at 96 and adapted to slide within a driving sleeve 98 which is secured at its upper end to the speedometer shaft and formed at its lower end with a squared portion 100 to engage the squared portion of the drive shaft 76. A bearing member 102 for the driving sleeve 98 may be secured within the sleeve 18 adjacent the squared portion 100. The speedometer 16 may be of any standard construction and has been shown as including the usual indicating pointer 104 and a scale 106 which are visible through a lens 108 mounted within an opening in the steering head 6.

Although shown and described in connection with a motorcycle front axle, it will be understood that the present speedometer driving mechanism may be not only employed in motor tricycle construction but may also be used with other types of wheel suspension than that disclosed herein. It will also be understood that I contemplate all such changes and modifications in the specific construction shown herein as may come within the scope of the appended claims.

I claim:

1. In a motorcycle, a frame, a wheel axle, a steering head swiveled on said frame, a front wheel fork including spaced hollow fork arms extending downwardly from said head, means for mounting said wheel axle on the lower ends of said fork arms, a speedometer mounted on said head, and means connecting said axle to said speedometer including a drive shaft extending longitudinally within one of said hollow fork arms.

2. In a motorcycle, a steering head, a front wheel fork including spaced fork arms extending downwardly from said head, each of said fork arms including telescoping members, a wheel axle mounted in the lower ends of said fork arms, a speedometer mounted on said head, and means connecting said axle to said speedometer including telescoping shaft sections extending through one of said fork arms.

3. In a motorcycle, a wheel axle, a steering head, a front wheel fork including spaced fork arms extending downwardly from said head, each of said fork arms including a pair of telescoping sleeves connected respectively to said head and axle, a spring interposed between the sleeves of each fork arm, a speedometer mounted on said head, and means connecting said axle to said speedometer including telescoping shaft sections extending coaxially within the sleeves and spring of one of said fork arms.

4. In a motorcycle, a wheel axle, a steering head, a wheel fork including spaced fork arms extending downwardly from said head, each of said fork arms including a pair of telescoping sleeves connected respectively to said head and axle and means associated therewith to provide a spring suspension and hydraulic damping means for said axle, a speedometer mounted on said head, and means connecting said axle to said speedometer including telescoping drive shaft sections extending longitudinally within one of said fork arms.

5. In a motorcycle, a wheel axle, a steering head, a wheel fork including spaced hollow fork arms extending downwardly from said head, spaced axle housings for said wheel axle, means to detachably secure said housings to the lower ends of said fork arms, a speedometer mounted on said head, and means connecting said axle to said speedometer including a drive gear and gear shaft mounted in one of said axle housings, a drive shaft having one end connected to said speedometer, said drive shaft being mounted within one of said hollow fork arms, and a disconnectible drive connection between the other end of said drive shaft and said gear shaft.

6. The elements set forth in claim 5 in which said disconnectible drive connection comprises a key and slot joint between the adjacent ends of said drive shaft and gear shaft, and resilient means to normally prevent the endwise separation thereof.

7. In a motorcycle, a steering head, a wheel fork including spaced fork arms extending downwardly from said head, each of said fork arms including upper and lower telescoping members with spring means interposed between said members, means to connect said upper members to said head, an axle housing detachably connected to said lower members of each fork arm, a wheel axle mounted in said axle housings, a speedometer mounted on said head, and means to drive said speedometer from said axle including a drive gear and gear shaft mounted in one of said axle housings, telescoping shaft sections mounted in one of said fork arms, means to connect one of said shaft sections to said speedometer, and a disconnectible drive joint between the other of said shaft sections and said gear shaft.

WILBUR L. CARLSON.